United States Patent [19]

Svoboda et al.

[11] 4,244,598
[45] Jan. 13, 1981

[54] ADJUSTING MECHANISM FOR SKI BINDINGS

[75] Inventors: Josef Svoboda, Schwechat; Erwin Krob, Vienna, both of Austria

[73] Assignee: TMC Corporation, Baar, Zug, Switzerland

[21] Appl. No.: 907,967

[22] Filed: May 22, 1978

[30] Foreign Application Priority Data

May 23, 1977 [AT] Austria .................. 3681/77

[51] Int. Cl.³ .............................. A63C 9/22
[52] U.S. Cl. .................................... 280/633
[58] Field of Search ................ 280/611, 633

[56] References Cited

U.S. PATENT DOCUMENTS 3,733,083  5/1973  Berchtold ...................... 280/633
3,966,218  6/1976  Beyl ............................... 280/633
4,022,493  5/1977  Weigl et al. .................... 280/633

FOREIGN PATENT DOCUMENTS 2522464  1/1976  Fed. Rep. of Germany ........... 280/633

Primary Examiner—Bruce H. Stoner, Jr.
Assistant Examiner—Gene A. Church
Attorney, Agent, or Firm—Blanchard, Flynn, Thiel, Boutell & Tanis

[57] ABSTRACT

An adjusting mechanism for facilitating an adjustment of the relative position between a ski binding part and a sole support. The ski binding part and the sole support are mounted on separate guide structures. The sole support is movable laterally of the longitudinal axis of the support structure therefor to facilitate a desired positioning thereof relative to the ski binding part.

5 Claims, 3 Drawing Figures

ADJUSTING MECHANISM FOR SKI BINDINGS

FIELD OF THE INVENTION

The invention relates to an adjusting mechanism for ski bindings having a carriage which supports the ski binding part and a base plate which is secured to the ski and forms a guideway for the carriage, wherein a rack or the like can engage a toothed locator or the like, which together form a locking device for the carriage, which carriage can be locked in longitudinal direction of the ski selectively in different positions, and wherein a laterally shiftable sole support is provided for the ski boot.

BACKGROUND OF THE INVENTION

Adjusting mechanisms of this kind are known in many different constructions. The invention has the purpose of providing an adjusting mechanism in particular for ski bindings which are used on rental skis. A problem exists in such ski bindings because together with the ski binding part a sole support or the like must also be adjusted. From this result long guide parts, which can be particularly disadvantageous when the ski flexes. In order to help in this instance, the base plate for the ski binding part and a holding plate for the sole support can be worked out as separate structural parts. From this in turn results the problem, that two connected structural parts are guided on two different holding parts, whereby for the longitudinal adjustment the rack requires additionally an exact guide therefor. To meet simultaneously several adjustments puts high requirements on the production tolerances and on the installation, which can be met only by large expenditures of time and money.

The purpose of the invention is now to provide a solution to the problem and to make possible an adjustment between the two connected structural parts, which are guided on at least two holding parts.

The set purpose is attained by the sole support being secured on the rack which extends in longitudinal direction of the ski by means of a bolt which extends substantially vertically to the upper side of the ski, and by the sole support being swingably supported through a limited range with respect to the rack about said bolt.

Through the inventive connection or support of the sole support on the rack it is possible for both guided parts to adjust to the associated holding parts, so that in each case only the adjustment of two structural parts is needed.

BRIEF DESCRIPTION OF THE DRAWING

Further advantages and details of the invention result from the following description, which is discussed with reference to the drawing, in which.

DETAILED DESCRIPTION

Figure 1:
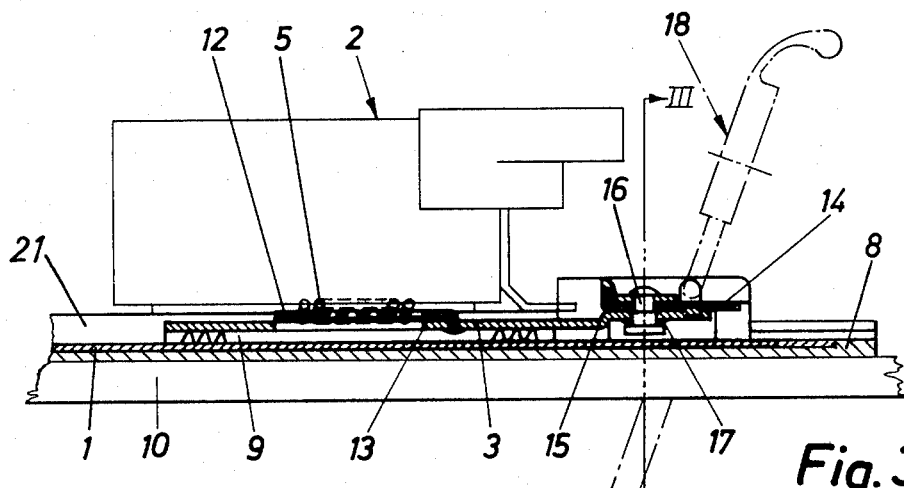
FIG. 1 is a side elevational view of the adjusting mechanism.
Figure 3:
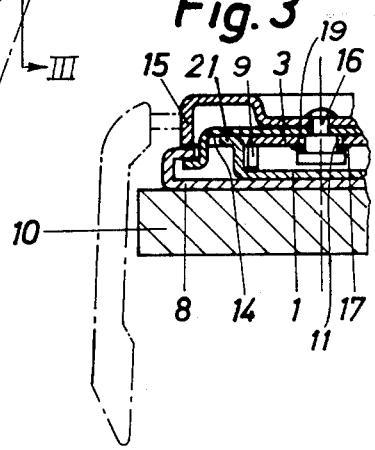
FIG. 3 is a sectional view taken along the line III—III in FIG. 1.
Figure 2:
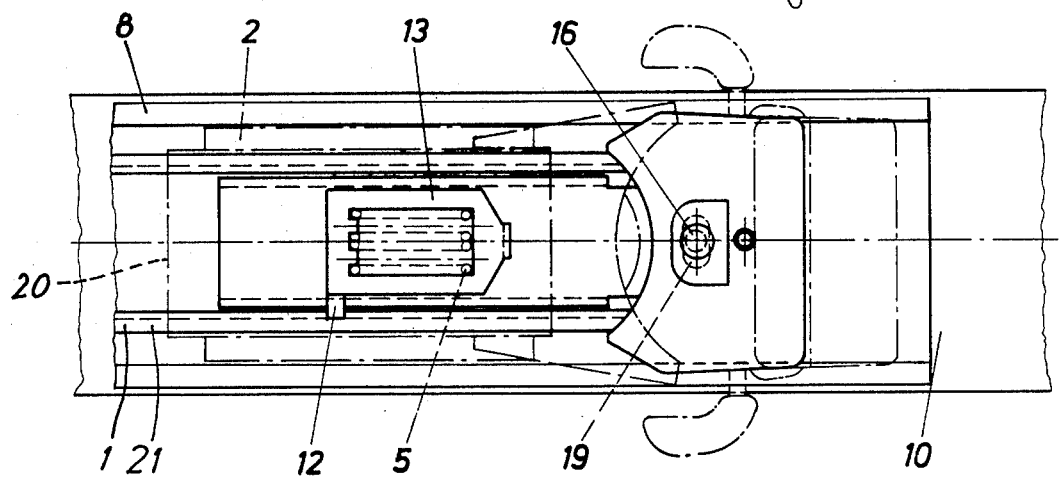
FIG. 2 is a top view.

As will be recognized from FIGS. 1 to 3, a base plate 1 is secured in a conventional manner on the upper surface of a ski 10, for example by screws (not shown). An anchoring plate 8 extends under the base plate 1. The anchoring plate 8 is, as will particularly be recognized from FIG. 3, bent along the lateral edges thereof upwardly and inwardly to extend over the lateral edges of a stepping plate 14. A sole support 15 is mounted on the stepping plate 14. A bent extension of a toothed rack 3 will be recognized in this area in FIG. 1, on which rack the support plate 14 and the sole support 15 are connected by means of a bolt 16. However, the sole support 15 is supported for a limited pivotal movement about the axis of the bolt 16 with respect to the rack 3. For this purpose the bolt 16 is riveted with the interpositioning of a spring washer 17.

As will particularly be recognized from FIGS. 1 and 2, a ski binding part is mounted on the rack 3, which ski binding part is identified as a whole by the reference numeral 2. For the ski binding part 2 to hold a not illustrated ski boot in the position of use, the thrust springs 5 are utilized. An indicator 12, which extends into a recess of a not illustrated guide plate of the ski binding part 2, shows the magnitude of the thrust force.

With reference to the sole support 15, a ski brake 18 will be recognized in the present exemplary embodiment, which ski brake is actually known and does not form the subject matter of the present invention. As a result, it will be shown that only the sole support 15 can be advantageously used also in connection with a ski brake 18 or in other words: through the inventive measure it is possible to accomplish also the advantages support and guiding of a ski brake.

The thrust springs 5 are supported at the one end in the thrust indicator 13 which is illustrated in FIGS. 1 and 2 and at the other end (right end in FIG. 2) on a support surface of the ski binding part 2, which support surface is not separately illustrated. In this manner the resilient support of the ski binding part 2 is achieved.

The ski binding part 2 has a carriage 20 movable longitudinally of the ski guided by rails 21 defined by the outwardly bent flanges on the base plate 1. The carriage 20 has the toothed rack 9 fixed thereto and movable therewith. The position of the ski binding part 2 on the ski is controlled by a not illustrated locking device transversely slidably mounted on the base plate 1. The locking device is described and shown in detail in U.S. Pat. No. 4,022,493 and reference is to be made thereto. The locking device has a toothed locator (not illustrated) which engages selected teeth on the rack 9. A sliding of the locking device transversely of the longitudinal axis of the ski will cause a release of the engagement between the toothed locator and the teeth on the rack 9 so that the ski binding part and the sole support 15 can move longitudinally of the ski. A return spring (not illustrated) effects a return of the toothed locator into engagement with new teeth on the rack 9 to lock the ski binding part and sole support 15 in the desired new position.

Particularly from FIG. 2 it will be recognized that the bolt 16 is arranged in a laterally elongated hole 19 in the toothed rack 3, which slotted hole extends substantially at a right angle with respect to the longitudinal axis of the ski, and which slotted hole permits a free lateral adjustment of the sole support 15 and stepping plate 14 to compensate for a possibly existing difference between the longitudinal axes of the base plate 1 and the anchoring plate 8.

A further thought of the invention consists in providing a stop 11 for limiting the lateral movement of the stepping plate 14 on the rack 3.

The invention is not limited to the disclosed exemplary embodiment. Deviations can take place without departing from the scope of the invention. For example, the arrangement of the base plate and support plate in vertical direction can be exchanged with one another and also the engagement of the holding parts and the guided structural parts can be different from what is shown both in direction of the angle and also in the type of the engagement.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An adjusting mechanism for a ski binding, comprising:
   a base plate secured to a ski and having means thereon defining an elongated guideway;
   a carriage adjustably movably mounted on said guideway;
   a toothed rack secured to and adjustably movable with said carriage, said toothed rack including a portion extending forwardly of said carriage;
   sole support means for supporting the sole of a ski boot and connecting means for connecting said sole support means to an upper surface of said forward portion of said toothed rack, said connecting means comprising means defining axially aligned first and second openings in said toothed rack and said sole support means, respectively, and a bolt received in said first and second openings, the axis of said first and second openings and, consequently, said bolt extending in a direction which is perpendicular to the upper surface of said ski, said sole support means being pivotal about said axis of said bolt and relative to said toothed rack and being adjustably movable with said carriage along said guideway, said connecting means further including means for facilitating a free lateral movement of said sole support means relative to said forward portion of said toothed rack; and
   stop means for limiting said lateral movement.

2. An adjusting mechanism for a ski binding, comprising:
   a base plate secured to a ski and having means thereon defining an elongated guideway;
   a carriage adjustably movably mounted on said guideway;
   a toothed rack secured to and adjustably movable with said carriage, said toothed rack including a portion extending forwardly of said carriage; and
   sole support means for supporting the sole of a ski boot and connecting means for connecting said sole support means to an upper surface of said forward portion of said toothed rack, said connecting means comprising means defining axially aligned first and second openings in said toothed rack and said sole support means, respectively, and a bolt received in said first and second openings, the axis of said first and second openings and, consequently, said bolt extending in a direction which is perpendicular to the upper surface of said ski, said sole support means being pivotal about said axis of said bolt and relative to said toothed rack, said sole support means including a sole support and a stepping plate, both having aligned openings therethrough and being connected to said toothed rack by said bolt, said stepping plate having downwardly extending and laterally outwardly bent flanges which extend underneath inwardly extending flanges on said base plate to thereby prevent a vertical lifting of said stepping plate and said sole support from said toothed rack, the overlapping relation of said outwardly bent flanges on said stepping plate and said inwardly extending flanges on said base plate facilitating said movement of said sole support with said toothed rack.

3. The adjusting mechanism according to claim 1, wherein a spring washer is positioned between said bolt and said one of said sole support means and said toothed rack.

4. An adjusting mechanism for a ski binding, comprising:
   a base plate secured to a ski and having means thereon defining an elongated guideway;
   a carriage adjustably movably mounted on said guideway;
   a toothed rack secured to and adjustably movable with said carriage, said toothed rack including a portion extending forwardly of said carriage;
   sole support means for supporting the sole of a ski boot and connecting means for connecting said sole support means to an upper surface of said forward portion of said toothed rack, said connecting means comprising means defining axially aligned first and second openings in said toothed rack and said sole support means, respectively, and a bolt received in said first and second openings, the axis of said first and second openings and, consequently, said bolt extending in a direction which is perpendicular to the upper surface of said ski, said sole support means being pivotal about said axis of said bolt and relative to said toothed rack;
   a slotted hole through said toothed rack, said bolt being arranged in said slotted hole, the length of said slotted hole extending substantially at a right angle with respect to the longitudinal axis of the ski, said slotted hole facilitating a lateral adjustment of said stepping plate to a possibly existing deviation of the longitudinal axes between said base plate and a further anchoring plate.

5. The adjusting mechanism according to claim 4, wherein a stop is provided on said toothed rack for limiting the lateral movement of said stepping plate.

* * * * *

UNITED STATES PATENT AND TRADEMARK OFFICE
CERTIFICATE OF CORRECTION

PATENT NO. : 4 244 598
DATED : January 13, 1981
INVENTOR(S) : Josef Svoboda et al It is certified that error appears in the above—identified patent and that said Letters Patent is hereby corrected as shown below:

On the title page and to the list of inventors, add the following as the name and place of residence of the third inventor:

"Karl Stritzl, Vienna, Austria"

Signed and Sealed this

Fourteenth Day of July 1981

[SEAL]

Attest:

Attesting Officer

GERALD J. MOSSINGHOFF

Commissioner of Patents and Trademarks